United States Patent
Nakajo et al.

(10) Patent No.: US 10,366,529 B2
(45) Date of Patent: Jul. 30, 2019

(54) RECORDING MEDIUM, INFORMATION PROCESSING APPARATUS, AND CONTROL METHOD

(71) Applicant: Live2D Inc., Tokyo (JP)

(72) Inventors: Tetsuya Nakajo, Tokyo (JP); Masayuki Todate, Tokyo (JP)

(73) Assignee: Live2D Inc., Tokyo (JP)

( * ) Notice: Subject to any disclaimer, the term of this patent is extended or adjusted under 35 U.S.C. 154(b) by 259 days.

(21) Appl. No.: 15/446,907

(22) Filed: Mar. 1, 2017

(65) Prior Publication Data

US 2017/0178393 A1 Jun. 22, 2017

Related U.S. Application Data

(63) Continuation of application No. PCT/JP2015/074565, filed on Aug. 31, 2015.

(30) Foreign Application Priority Data

Sep. 5, 2014 (JP) ................................. 2014-181551

(51) Int. Cl.
*A63F 13/525* (2014.01)
*G06T 15/20* (2011.01)
(Continued)

(52) U.S. Cl.
CPC .......... *G06T 15/205* (2013.01); *A63F 13/525* (2014.09); *A63F 13/5255* (2014.09);
(Continued)

(58) Field of Classification Search
USPC ........................................................ 463/32
See application file for complete search history.

(56) References Cited

U.S. PATENT DOCUMENTS

2015/0235373 A1* 8/2015 Kato ................... A61B 1/00009
348/51
2016/0337612 A1* 11/2016 Im .......................... G06T 19/006
(Continued)

FOREIGN PATENT DOCUMENTS

JP 2009-104570 A 5/2009
JP 2009-129183 A 6/2009
(Continued)

OTHER PUBLICATIONS

International Search Report for PCT/JP2015/074565, dated Dec. 15, 2015.

*Primary Examiner* — Pierre E Elisca
(74) *Attorney, Agent, or Firm* — Merchant & Gould P.C.

(57) ABSTRACT

An information processing apparatus generates rendered images associated with 3D representations of an object indicated by image groups each including a plurality of parts of 2D images by using the image group to perform at least one of movement and deformation of each part included in the image groups. At this time, the apparatus sequentially decides rendering directions in which the object is rendered in the rendered images, and determines a moving direction determined by transition of the sequentially decided rendering directions. The apparatus differentiates the rendering direction, in which at least some parts of the image groups used to generate the rendered images are changed to different parts, in accordance with the determined moving direction.

12 Claims, 10 Drawing Sheets

(51) Int. Cl.
- *G06T 13/20* (2011.01)
- *G06T 19/00* (2011.01)
- *H04N 13/275* (2018.01)
- *H04N 13/111* (2018.01)
- *A63F 13/5255* (2014.01)
- *H04N 13/261* (2018.01)

(52) U.S. Cl.
CPC .............. *G06T 13/20* (2013.01); *G06T 19/00* (2013.01); *H04N 13/111* (2018.05); *H04N 13/261* (2018.05); *H04N 13/275* (2018.05)

(56) References Cited

U.S. PATENT DOCUMENTS

2017/0329428 A1* 11/2017 Seong ...................... G06F 3/041
2018/0234639 A1*  8/2018 Kim ...................... H04N 5/2621

FOREIGN PATENT DOCUMENTS

| JP | 2009-294895 A | 12/2009 |
| JP | 2011-039828 A |  2/2011 |
| JP | 2012-023488 A |  2/2012 |

* cited by examiner

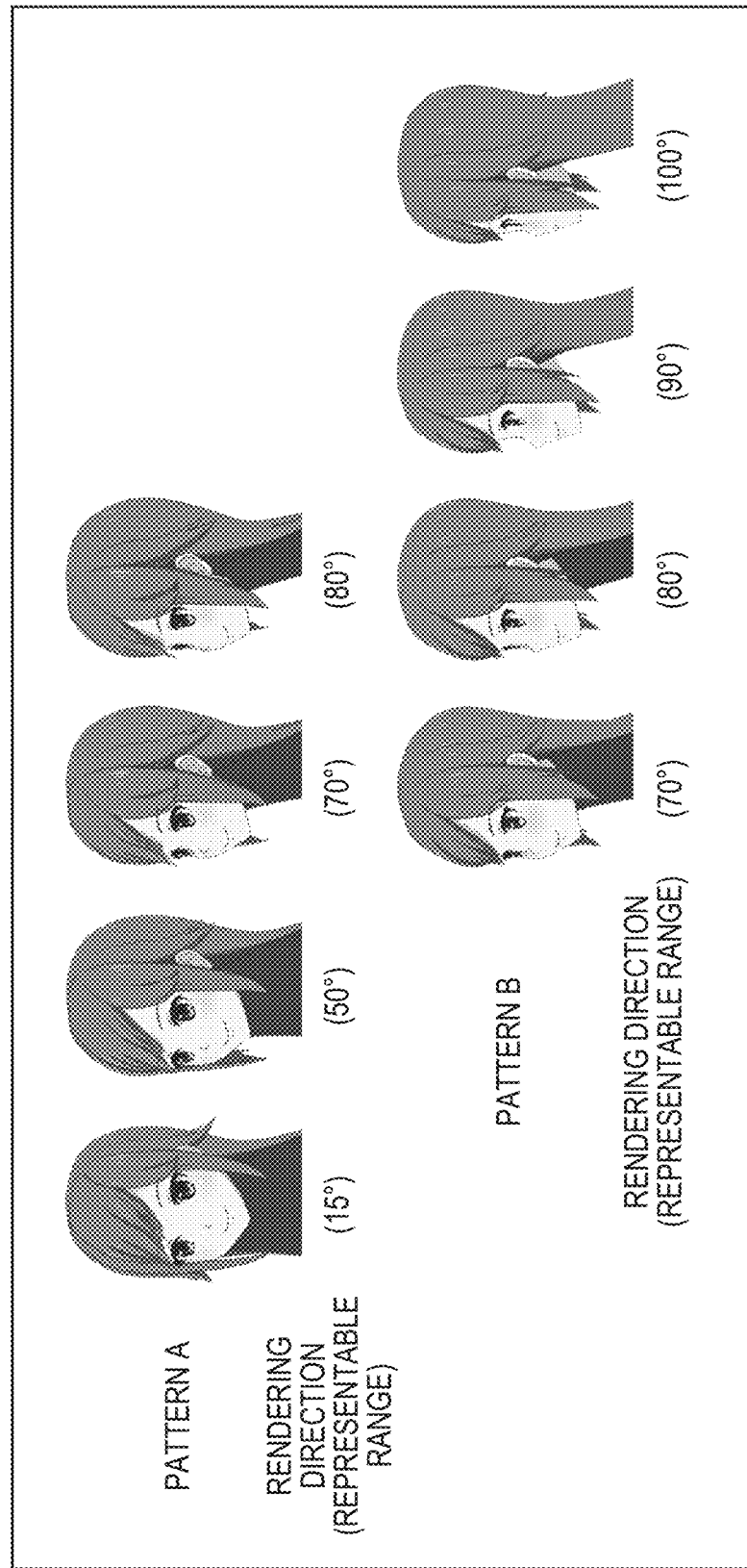

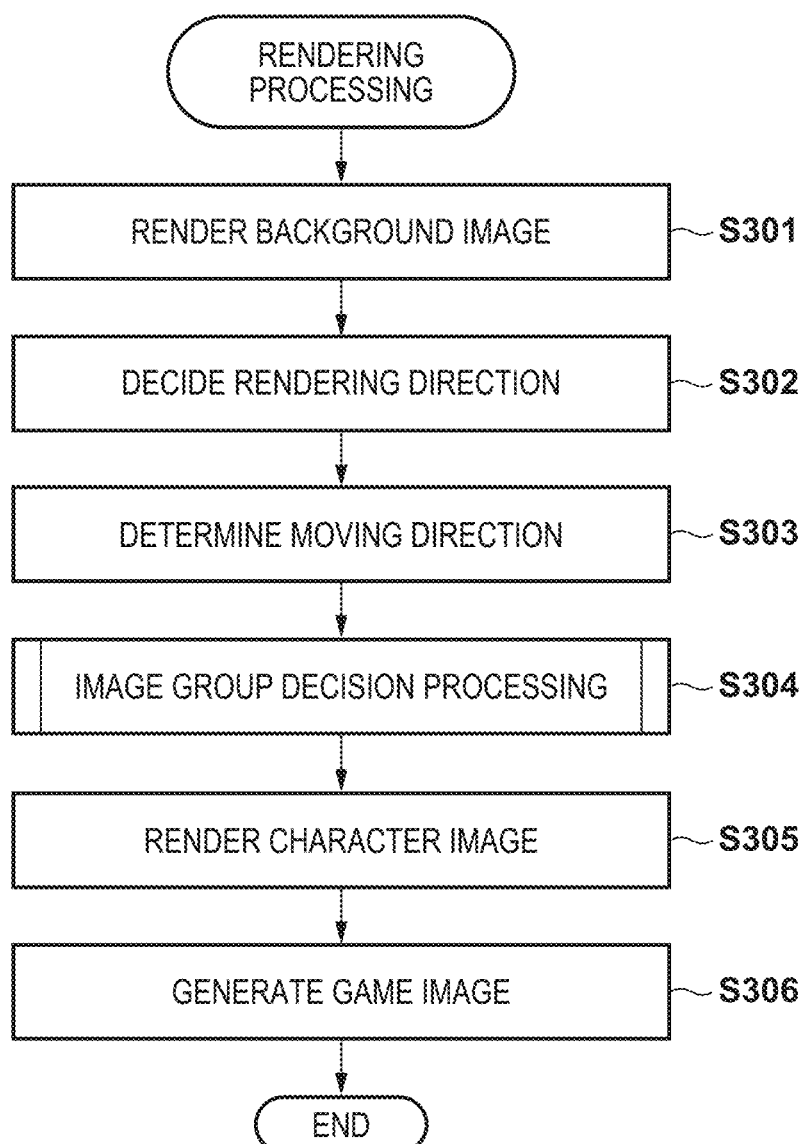

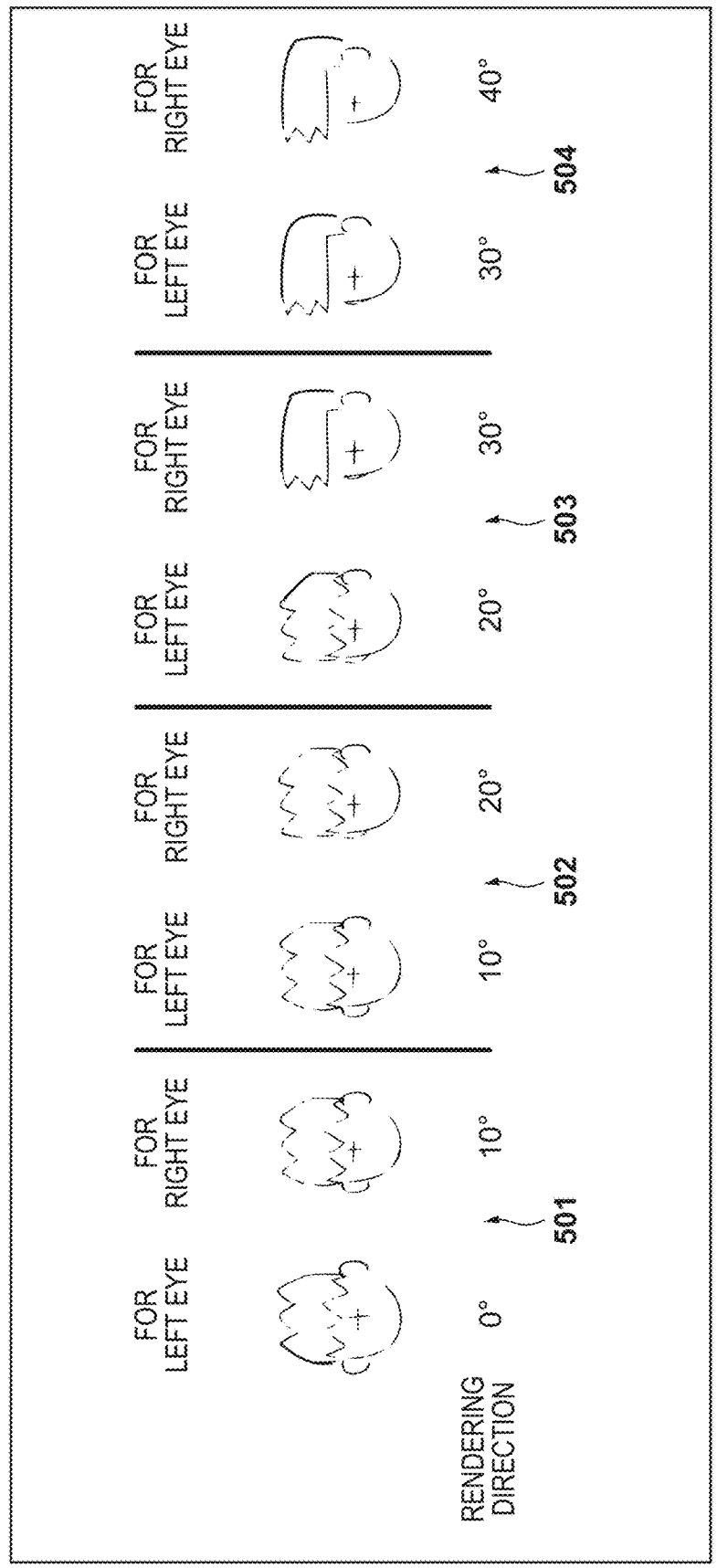

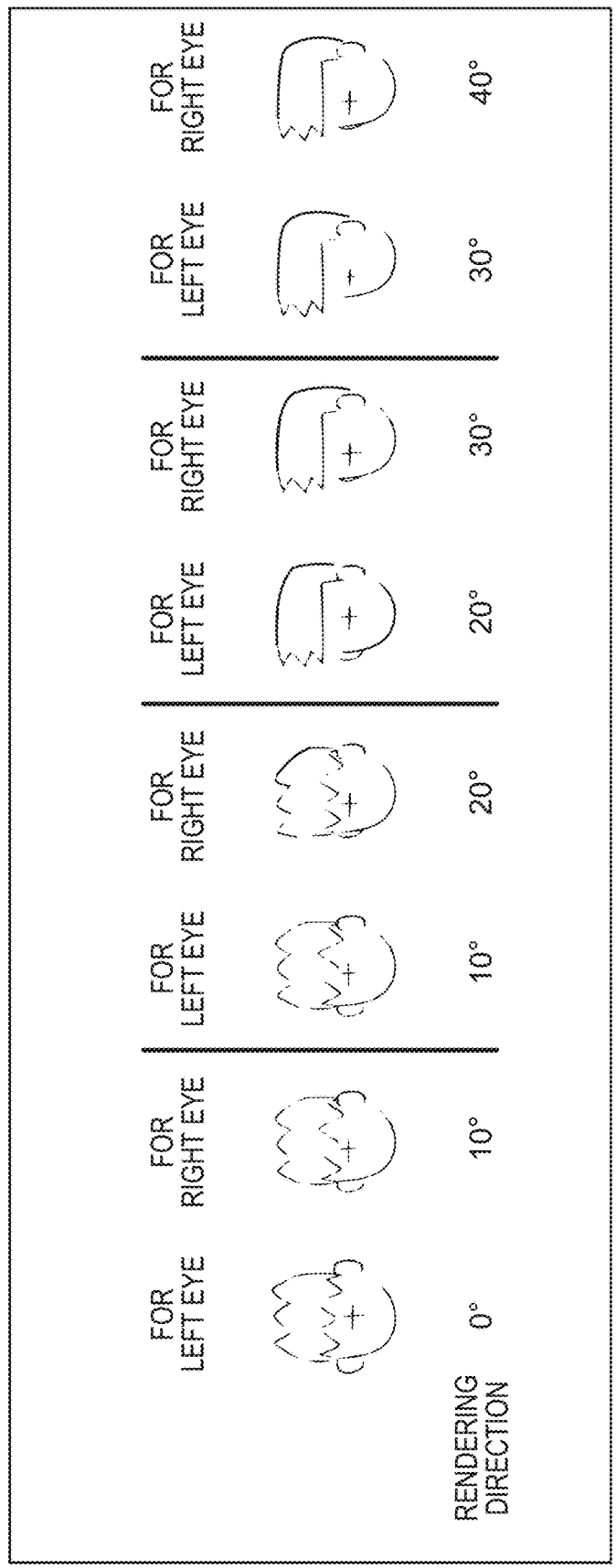

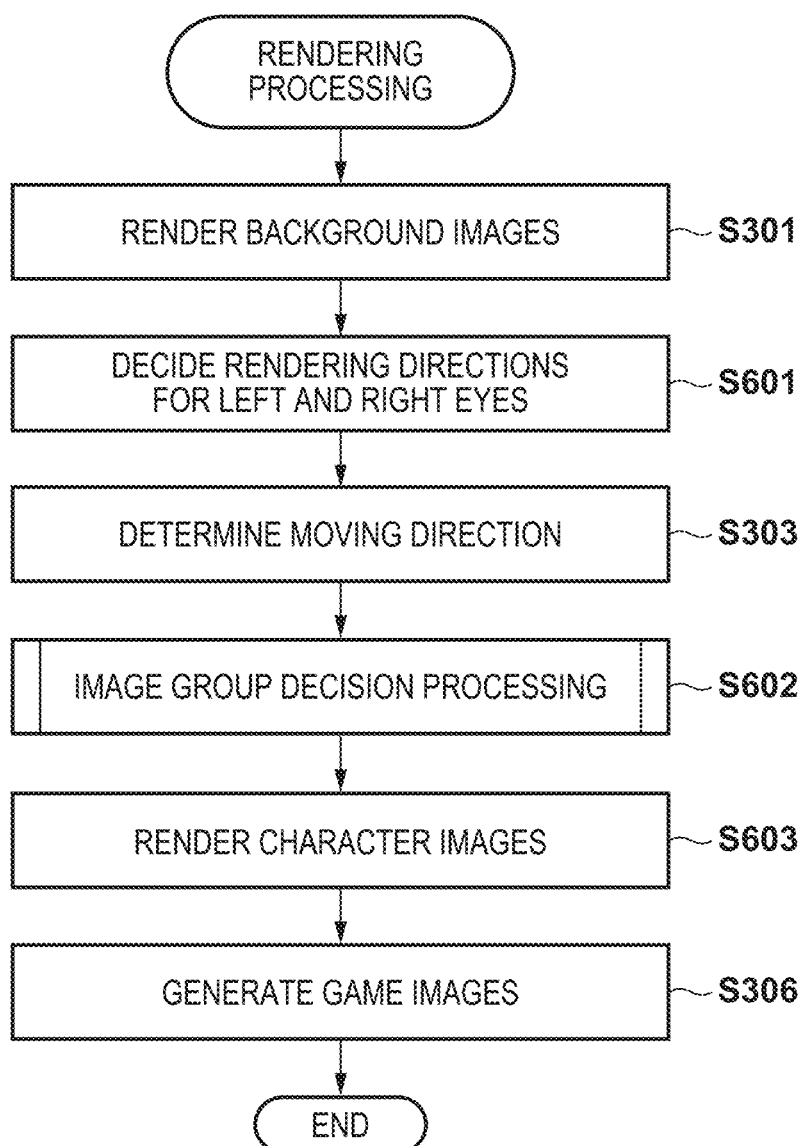

RECORDING MEDIUM, INFORMATION PROCESSING APPARATUS, AND CONTROL METHOD

This application is a continuation of International Patent Application No. PCT/JP2015/074565 filed on Aug. 31, 2015, and claims priority to Japanese Patent Application No. 2014-181551 filed on Sep. 5, 2014, the entire content of both of which is incorporated herein by reference.

BACKGROUND OF THE INVENTION

Field of the Invention

The present invention relates to a recording medium, an information processing apparatus, and a control method and, more particularly, to a technique of presenting a 3D representation by geometric deformation of a 2D image.

Background Art

In recent years, in the field of computer graphics represented by a game content, it has become possible to present an image which allows an observer to perceive a sense of depth and a stereoscopic effect using a 3D model. In such 3D graphics, in general, a 3D model is constructed based on a plurality of 2D images (cuts) prepared by a designer or the like, and a texture is applied to the model, thereby performing rendering.

In 3D graphics rendered by applying a texture, however, even if the 3D structure of a 3D model is represented by using a technique such as tessellation, an image rendered by applying a texture to the model may give an impression different from the cut initially prepared by the designer or the like. This is because it is difficult to obtain such effect in an image of 3D graphics "correctly" rendered with respect to a specific viewpoint by applying a texture to a model, as compared with a 2D image in which the designer readily reflects an effective appearance to the observer. More specifically, for example, in animation or a cartoon, inconsistent performance representation or so-called "unrealistic" representation can be performed for a characteristic portion such as a hairstyle, a contour, or clothing represented as the personality of a character so that the characteristic shape appears even if the character faces in any direction. On the other hand, in 3D graphics, since a 3D model is basically fixed, such representation is difficult, and an image of the character which gives an impression different from that intended by the designer is resultantly presented. In recent years, rendering representation close to animation has become possible by applying toon rendering technique or toon shader. However, such rendering representation requires fine adjustment, and tends to increase the calculation amount necessary for rendering. An apparatus capable of rendering graphics can be limited to a high-performance rendering apparatus such as a so-called next-generation apparatus.

Furthermore, a 2D image handwritten by the designer has the appeal of the representation unique to the 2D image. Although 3D graphics are becoming the mainstream, a game content or the like in which a 2D image is mainly used in a game screen has been supported to some extent. Japanese Patent Laid-Open No. 2009-104570 discloses a rendering technique capable of representing 3D animation while maintaining the atmosphere and appeal of a 2D image rendered by a designer. More specifically, in Japanese Patent Laid-Open No. 2009-104570, after dividing a 2D image into parts such as hair, eyebrows, and eyes, a predetermined 3D shape is assigned to each part and, in accordance with movement of a base part, geometric deformation of the 2D images of the remaining parts is defined, thereby implementing representation desired by the designer without damaging the impression of the original 2D image.

SUMMARY OF THE INVENTION

Technical Problem

In Japanese Patent Laid-Open No. 2009-104570, however, a 3D representation of a character which can be represented using, for example, a 2D image of the character facing front is limited in terms of a movable range. That is, since, with an image of a character rendered in the front direction, it is impossible to represent an angle at which a portion that cannot be covered by a 2D image in the front direction appears at the time of rotation in the yaw direction, that is, when the character turns the face to the side, the movable range is limited depending on the arrangement of a 2D image to be used.

On the other hand, there is conventionally provided a method capable of presenting a different image depending on the observation angle of the observer, such as a postcard using a lenticule. This presentation method allows the observer to observe only a predetermined one of a plurality of presentable images at a viewpoint (the eyeballs of the observer) located within a specific angle range.

Therefore, it is considered that the movable range of a 3D representation of a character according to Japanese Patent Laid-Open No. 2009-104570 can be extended using the presentation method. That is, by switching, in accordance with a viewpoint direction defined for a screen generated for presentation, between a plurality of 2D images obtained by rendering the same character from different directions, and presenting a 3D representation, it is possible to present 3D representations obtained by observing the character of the 2D image from all directions.

However, if a different 2D image is used in accordance with the observation angle of the observer, that is, if a 2D image used for the 3D representation of a character is switched at a specific angle, the observer readily perceives the occurrence of switching. Especially if it is possible to perform inconsistent representation of the character, the observer more readily perceives the occurrence of switching of a 2D image used. Furthermore, for example, if a viewpoint serving as a reference of character rendering frequently moves over the angle at which the 2D image is switched, the 2D image used for the 3D representation is frequently switched, and a so-called screen flickering impression may be given to the observer, thereby reducing an observer's interest in the character or the game content.

The present invention has been made in consideration of the above problem, and provides a program of making it difficult to perceive switching of a 2D image used for the 3D representation of the 2D image, an information processing apparatus, a control method, and a recording medium.

Solution to Problem

The present invention in its first aspect provides a non-transitory computer-readable recording medium recording a program for causing at least one computer, capable of generating a left-eye rendered image and a right-eye rendered image for binocular stereopsis which are associated with 3D representations of an object indicated by image groups each including a plurality of parts of 2D images by using the image groups to perform at least one of movement and deformation of each part included in the image groups, to execute: processing of sequentially deciding rendering directions in which the object is rendered in the rendered images; processing of determining a moving direction determined by transition of the rendering directions sequentially decided in the processing of sequentially deciding; processing of differentiating the rendering direction, in which at least some parts of the image groups used to generate the rendered images are changed to different parts, in accordance with the moving direction determined in the processing of determining; and processing of changing a plurality of parts included in the image groups used to generate the rendered images, based on a result of the processing of differentiating, wherein if parts included in the image group used for the left-eye rendered image are different from parts included in the image group used for the right-eye rendered image, the processing of changing changes the parts included in the image group used for one of the rendered images to be the same as the parts included in the image group used for the other rendered image.

The present invention in its second aspect provides a non-transitory computer-readable recording medium recording a program for causing at least one computer, capable of generating a left-eye rendered image and a right-eye rendered image for binocular stereopsis which are associated with 3D representations of an object indicated by model groups each including a plurality of parts of 3D models by using the model groups, to execute: processing of sequentially deciding rendering directions in which the object is rendered in the rendered images; processing of determining a moving direction determined by transition of the rendering directions sequentially decided in the processing of sequentially deciding; processing of differentiating the rendering direction, in which at least some parts of the model groups used to generate the rendered images are changed to different parts, in accordance with the moving direction determined in the processing of determining; and processing of changing a plurality of parts included in the model groups used to generate the rendered images, based on a result of the processing of differentiating, wherein if parts included in the model group used for the left-eye rendered image are different from parts included in the model group used for the right-eye rendered image, the processing of changing changes the parts included in the model group used for one of the rendered images to be the same as the parts included in the model group used for the other rendered image.

The present invention in its third aspect provides an information processing apparatus for generating a rendering instruction of a left-eye rendered image and a right-eye rendered image for binocular stereopsis which are associated with 3D representations of an object indicated by image groups each including a plurality of parts of 2D images by using the image groups to perform at least one of movement and deformation of each part, comprising: a decider which is able to sequentially decide rendering directions in which the object is rendered in the rendered images; a determiner which is able to determine a moving direction determined by transition of the rendering directions sequentially decided by the decider; a controller which is able to differentiate the rendering direction, in which at least some parts of the image groups used to generate the rendered images are changed to different parts, in accordance with the moving direction determined by the determiner; and a changer which is able to change a plurality of parts included in the image groups used to generate the rendered images, based on a control result by the controller, wherein if parts included in the image group used for the left-eye rendered image are different from parts included in the image group used for the right-eye rendered image, the changer changes the parts included in the image group used for one of the rendered images to be the same as the parts included in the image group used for the other rendered image.

The present invention in its fourth aspect provides an information processing apparatus for generating a rendering instruction of a left-eye rendered image and a right-eye rendered image for binocular stereopsis which are associated with 3D representations of an object indicated by model groups each including a plurality of parts of 3D models by using the model groups, comprising: a decider which is able to sequentially decide rendering directions in which the object is rendered in the rendered images; a determiner which is able to determine a moving direction determined by transition of the rendering directions sequentially decided by the decider; a controller which is able to differentiate the rendering direction, in which at least some parts of the model groups used to generate the rendered images are changed to different parts, in accordance with the moving direction determined by the determiner; and a changer which is able to change a plurality of parts included in the model groups used to generate the rendered images, based on a control result by the controller, wherein if parts included in the model group used for the left-eye rendered image are different from parts included in the model group used for the right-eye rendered image, the changer changes the parts included in the model group used for one of the rendered images to be the same as the parts included in the model group used for the other rendered image.

The present invention in its fifth aspect provides a control method for an information processing apparatus for generating a rendering instruction of a left-eye rendered image and a right-eye rendered image for binocular stereopsis which are associated with 3D representations of an object indicated by image groups each including a plurality of parts of 2D images by using the image groups to perform at least one of movement and deformation of each part, the method comprising: a decision step of sequentially deciding rendering directions in which the object is rendered in the rendered images; a determination step of determining a moving direction determined by transition of the rendering directions sequentially decided in the decision step; a control step of differentiating the rendering direction, in which at least some parts of the image groups used to generate the rendered images are changed to different parts, in accordance with the moving direction determined in the determination step; and a change step of changing a plurality of parts included in the image groups used to generate the rendered images, based on a control result in the control step, wherein if parts included in the image group used for the left-eye rendered image are different from parts included in the image group used for the right-eye rendered image, the parts included in the image group used for one of the rendered images are changed in the change step to be the same as the parts included in the image group used for the other rendered image.

The present invention in its sixth aspect provides a control method for an information processing apparatus for generating a rendering instruction of a left-eye rendered image and a right-eye rendered image for binocular stereopsis which are associated with 3D representations of an object indicated by model groups each including a plurality of parts of 3D models by using the model groups, the method comprising: a decision step of sequentially deciding rendering directions in which the object is rendered in the rendered images; a determination step of determining a moving direction determined by transition of the rendering directions sequentially decided in the decision step; a control step of differentiating the rendering direction, in which at least some parts of the model groups used to generate the rendered images are changed to different parts, in accordance with the moving direction determined in the determination step; and a change step of changing a plurality of parts included in the model groups used to generate the rendered images, based on a control result in the control step, wherein if parts included in the model group used for the left-eye rendered image are different from parts included in the model group used for the right-eye rendered image, the parts included in the model group used for one of the rendered images are changed in the change step to be the same as the parts included in the model group used for the other rendered image.

Advantageous Effects of Invention

According to the present invention, this arrangement can make it difficult to perceive switching of a 2D image used for the 3D representation of the 2D image.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the present invention.

FIGS. 2A and 2B are views for explaining part information according to the embodiment of the present invention;

FIG. 3 is a flowchart exemplifying rendering processing executed in the PC 100 according to the first embodiment of the present invention;

FIGS. 5A and 5B are views for explaining a problem in generation of images for binocular stereopsis according to the second embodiment of the present invention;

FIG. 6 is a flowchart exemplifying rendering processing executed in a PC 100 according to the second embodiment of the present invention.

DESCRIPTION OF THE EMBODIMENTS

[First Embodiment]

Figure 1:
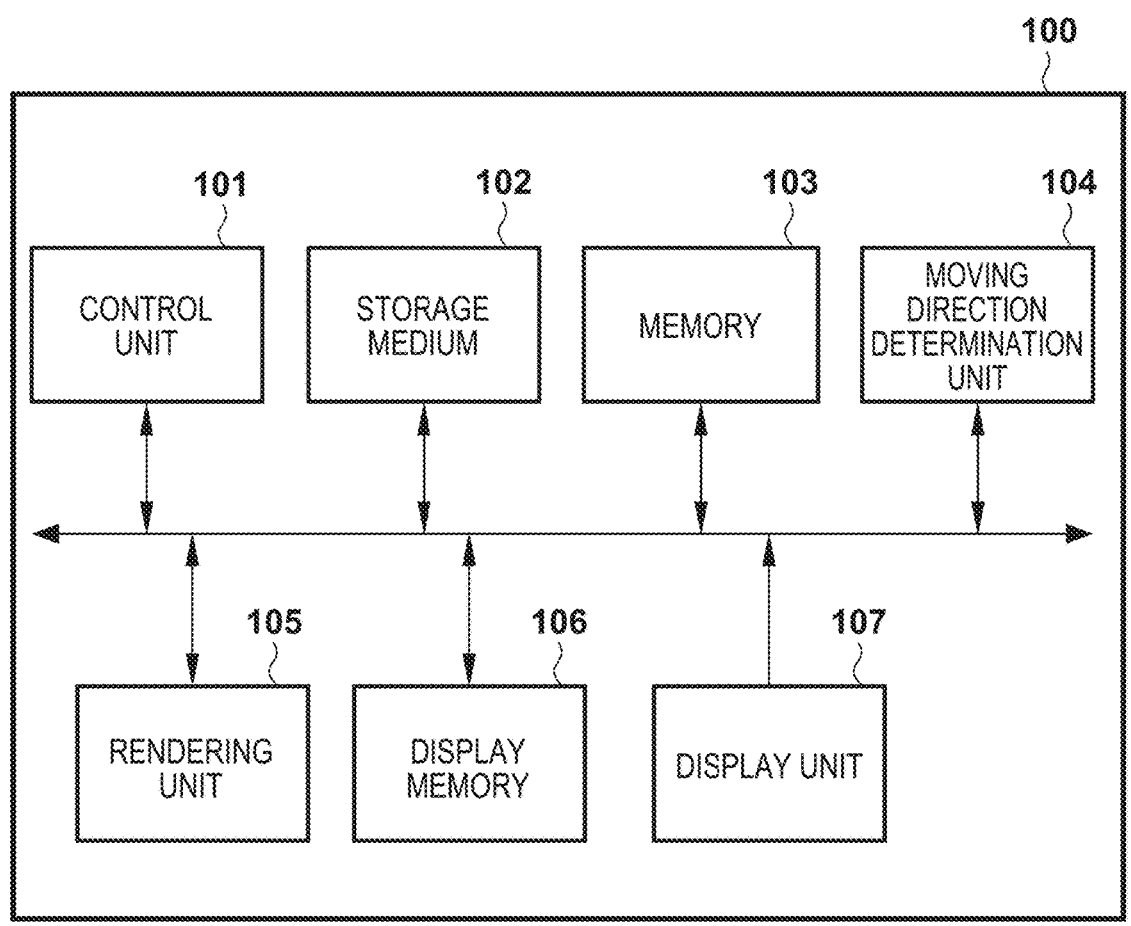
FIG. 1 is a block diagram showing the functional arrangement of a PC 100 according to an embodiment of the present invention.

An exemplary embodiment of the present invention will be described in detail below with reference to the accompanying drawings. Note that an embodiment to be described below will explain an example in which the present invention is applied to a PC, as an example of an information processing apparatus, capable of executing a game program of outputting a game image associated with the 3D representation of a character indicated by an image group including a plurality of parts of 2D images by using the image group to perform at least one of movement and deformation of each part included in the image group. However, the present invention is applicable to an arbitrary apparatus capable of generating a rendered image associated with the 3D representation of an object indicated by an image group including a plurality of parts of 2D images by using the image group to perform at least one of movement and deformation of each part included in the image group.

Furthermore, in this specification, a "rendering direction" indicates a direction in which a character is rendered in a game image presenting the 3D representation of the character, that is, an image displayed on a display device. Since the direction in which the character is rendered in the game image changes by not only movement of a viewpoint serving as a rendering reference but also movement, rotation, and the like of the character, the expression "rendering direction" is used in this specification to collectively define the direction in which the character is rendered, that can change due to the above factors. That is, the "rendering direction" is a concept defined with respect to the relative relationship between a viewpoint direction defined in rendering and a direction (for example, the front direction of the character) predetermined for the character.

In addition, in this specification, a "moving direction" indicates the moving direction of a viewpoint serving as the rendering reference of a character, which is defined based on transition of the rendering directions in sequentially generated game images and is relatively determined based on a direction predetermined for the character. As described above, in this specification, the rendering direction changes by not only movement of the viewpoint but also movement and rotation of the character. Thus, even if the viewpoint determined to render a game image is fixed, if the character moves, the viewpoint relatively moves in consideration of a coordinate system with reference to the character. In this specification, the moving direction of the viewpoint based on the transition of the rendering directions is defined as the "moving direction".

Therefore, for example, in sequentially generated game images, if a character facing front turns in the right direction of the character by yaw rotation about an vertical axis (turns in the left direction of the game image), the rendering direction changes from "a direction in which rendering is performed from the front side" to "a direction in which rendering is performed from the left front side", and the moving direction is determined as a right direction by setting the vertical axis of the character as a center, or a positive rotation direction (counterclockwise direction) in a left-handed system.

<<Arrangement of PC 100>>

FIG. 1 is a block diagram showing the functional arrangement of the PC 100 according to the embodiment of the present invention.

A control unit 101 is, for example, a control device such as a CPU, and controls the operations of the respective blocks of the PC 100. More specifically, the control unit 101 reads out a program related to an operating system stored in a storage medium 102, a game program related to a game application (to be described later), or the like, loads it into a memory 103, and executes it, thereby controlling the operations of the respective blocks.

The storage medium 102 is, for example, a nonvolatile memory such as a rewritable ROM, or a storage device such as an HDD detachably connected to the PC 100. The storage medium 102 may include a recording medium such as a disk recording a game program accessible via a predetermined readable/writable interface such as an optical drive. The storage medium 102 stores information of parameters and the like necessary for the operations of the respective blocks, various kinds of data used to generate game images, and the like in addition to the above-described game program. The various kinds of data used to generate game images include information (part information) related to parts rendered as 3D representations in the game application, and 2D images related to the respective parts.

The memory 103 may be, for example, a volatile memory such as a RAM. The memory 103 is used not only as a loading area for loading the program and the like read out from the storage medium 102 but also as a storage area for storing intermediate data and the like output in the operations of the respective blocks.

Based on information of transition of rendering directions in game images related to respective frames displayed on a display unit 107 (to be described later), a moving direction determination unit 104 determines a direction indicated by a moving direction. In this embodiment, if a character is rendered at the field center, a rendering direction in a game image related to each frame can be calculated as an angle formed by a vector from a viewpoint serving as a rendering reference to the reference position of the character and a direction vector predetermined as the front direction of the character, and rendering directions the number of which is equal to a predetermined number of frames need only be held in the memory 103. The moving direction determination unit 104 determines the moving direction with reference to the pieces of rendering direction information (angles), the number of which is equal to the predetermined number of frames. Note that if the character is not rendered at the field center, a rendering direction may be calculated in consideration of an angle formed by a vector from the viewpoint to the field center (fixation point) and a vector from the viewpoint to the reference position of the character.

A rendering unit 105 is a rendering device such as a GPU. The rendering unit 105 performs rendering processing of generating game images including the 3D representations of the character based on a 2D image group based on pieces of part information determined for the rendering directions. The game images generated in the rendering processing of the rendering unit 105 are stored in a display memory 106.

The display unit 107 is, for example, a display device such as an LCD incorporated in the housing of the PC 100 or externally connected to the PC 100. The display unit 107 displays, in a display area at predetermined timings according to a frame rate, the game images stored in the display memory 106 by the rendering unit 105.

<<Part Information and Outline of Decision of 2D Image Group to be Used>>

The above-described part information stored in the storage medium 102 and an outline of decision, based on the part information, of a 2D image group to be used will now be described.

The part information is formed by subdividing a 2D image of the character into portions such as eyes, a nose, a mouth, eyebrows, a contour, ears, hair, a neck, a body, and arms, and including various kinds of information about the portions. In this embodiment, the part information determines, for each of a plurality of predetermined kinds of rendering directions (reference rendering directions), a part portion to be used to render the 3D representation of the character and information of a 2D image (part image) to be used as the part portion. The part information is formed by including a predetermined rendering direction range (representable range or movable range) having, as a center, a reference rendering direction in which the 3D representation of the character is rendered using a part image group determined for each reference rendering direction. In order to render the 3D representation, the part information includes information of a 3D shape to which each part image is applied or information related to at least one of time transition elements of movement and deformation applied to each part image when a specific operation is performed within the movable range. The information of the time transition element may be information for controlling to successively or appropriately perform movement and deformation by, for example, interpolating a plurality of predetermined pieces of movement and deformation information in accordance with a change in angle corresponding to the rendering direction, instead of intermittently performing movement to a specific position or deformation into a specific shape at an angle corresponding to a specific rendering direction. Information of at least one of movement and deformation applied to each part image may be predetermined for each operation by, for example, a motion designer or the like, may be determined by a predetermined movement/deformation function or the like, or may be generated by a combination of patterns or the like.

Figure 2A:
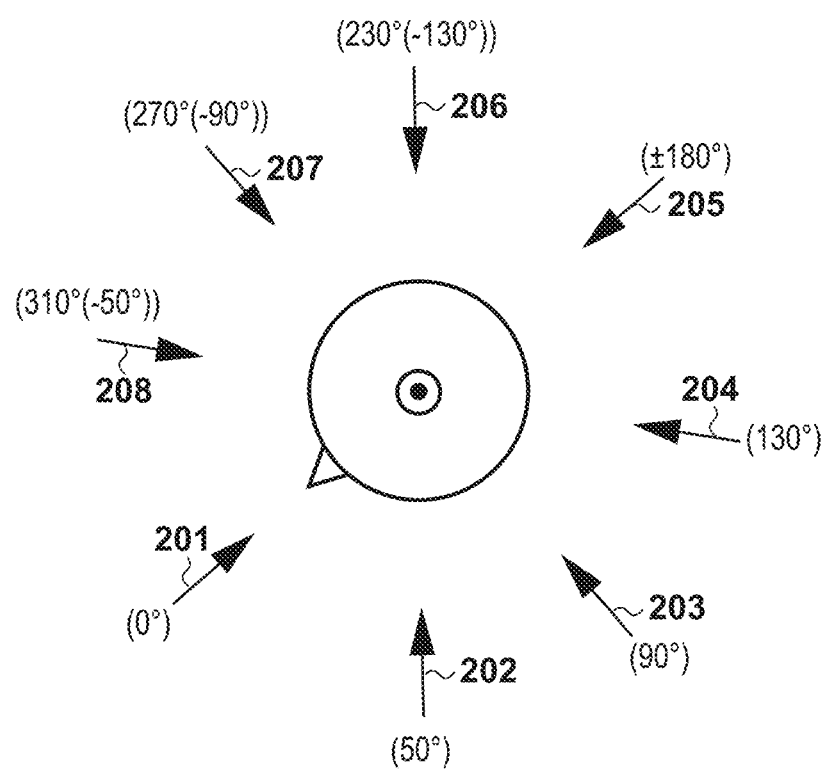

As described above, in the part information according to this embodiment, a representable range within which the 3D representation of the character is rendered using the same part image group is set for each of a plurality of kinds of reference rendering directions. However, for example, if reference rendering directions are determined around the character, representable ranges determined for adjacent reference rendering directions are configured to overlap each other, as shown in FIGS. 2A and 2B. In an example shown in FIG. 2A, predetermined reference rendering directions 201 to 208 are shown when a fixation point in a line-of-sight direction is set at the center of the head of the character. In FIG. 2A, when the vertical direction passing through the center of the head of the character is set as a rotation axis and a direction (a direction in which the character faces) corresponding to the front of the character is set as a reference, each of the reference directions 201 to 208 is identified by an angle formed from the reference direction in the counterclockwise direction.

At this time, for 3D representations (pattern A) rendered using a part image group predetermined for a reference rendering direction corresponding to 50°, rendering directions corresponding to a range of 15° to 80° are set as a representable range, as shown in FIG. 2B. On the other hand, for 3D representations (pattern B) rendered using a part image group predetermined for a reference rendering direction corresponding to 90°, a range of 70° to 100° is set as a representable range, as shown in FIG. 2B. Consequently, a range within which the 3D representations of pattern A are rendered using the part image group prepared in advance for the reference rendering direction corresponding to 50° and a range within which the 3D representations of pattern B are rendered using the part image group prepared in advance for the reference rendering direction corresponding to 90° overlap in a range (overlapping range) of 70° to 80°. This indicates that the 3D representation of the character within this range is rendered using one of the part image group related to pattern A and that related to pattern B.

The PC 100 according to this embodiment differentiates a threshold of a direction (angle) in which the part image group is changed between a case wherein the moving direction defined by transition of the rendering directions is a direction in which the part image group is changed from pattern A to pattern B and a case wherein the moving direction is a direction in which the part image group is changed from pattern B to pattern A. More specifically, the angle threshold when changing the part image group used to render the 3D representation of the character from the part image group related to pattern A to that related to pattern B, that is, when indicating the moving direction in which the angle corresponding to the reference rendering direction of each pattern increases is set to the maximum angle=80° of the overlapping range. On the other hand, the angle threshold when changing the part image group used to render the 3D representation of the character from the part image group related to pattern B to that related to pattern A, that is, when indicating the moving direction in which the angle corresponding to the reference rendering direction of each pattern decreases is set to the minimum angle=70° of the overlapping range. More specifically, which of the part image groups is used in the overlapping range to perform rendering is determined in accordance with the thus set threshold and the part image group used to render the 3D representation of the character for the immediately preceding frame.

If, for example, the 3D representation of pattern A is used for the immediately preceding frame, when the rendering direction included in the overlapping range is set by the operation of the character or movement of the viewpoint, the part image group related to pattern A is used. On the other hand, when setting, for example, a rendering direction corresponding to 82° by exceeding the representable range related to pattern A, that is, when indicating the moving direction in which the angle corresponding to the rendering direction increases, the maximum angle of the overlapping range as the angle threshold is exceeded, and thus the part image group related to pattern B is used. Then, when setting a rendering direction included in the overlapping range by the operation of the character or movement of the viewpoint in a succeeding frame, that is, when indicating the moving direction in which an angle corresponding to the rendering direction decreases, the angle threshold is changed to the minimum angle of the overlapping range, and thus the part image group related to pattern B, which has been used for the previous frame, is used instead of the part image group related to pattern A.

With this operation, even if a rendering direction included in the overlapping range is designated after the part image group used for the 3D representation is switched to that of a different pattern (A→B), the part image group related to the pattern after switching is used to render the 3D representation. This can make it difficult for the observer to perceive that the part image group is switched in a rendering direction corresponding to a specific angle. That is, as for a part, for which different part images are used between the patterns, among the parts determined for the character, the PC 100 according to this embodiment controls to use the part image after switching as much as possible after the pattern is switched. Therefore, for example, after pattern A is switched to pattern B, even if, at an angle close to 80° as the limit value of the representable range of pattern A, a rendering direction corresponding to the angle is frequently switched, it is possible to avoid display which can reduce an observer's interest by frequent switching some part images.

The example of FIG. 2B shows generated images related to each pattern when rendering the 3D representations of the head of the character. In the part image group related to pattern A and that related to pattern B, by comparing them, part images appropriate for the respective reference rendering directions, such as the outer shape and shielding relationship of hair, shading of hair, the shape of a nose, the emphasis portion of the edge of a contour, and the shape of an eye or eyebrow, are preset. Thus, at least some part images are different. Therefore, if the pattern is switched for these parts, a different impression can be given to the observer with respect to the 3D representation of the character. After that, however, control is performed to hold the use of the part image group after switching. This can make it difficult to perceive switching of the part image group used, as described above.

Note that the part information may be information indicating whether to use a part image to render the 3D representation of the character with respect to the set rendering direction or information formed by including information indicating which of the plurality of kinds of part images provided for the respective rendering directions for each part portion is used.

<<Rendering Processing>>

Rendering processing of generating game images related to the game application, which is executed by the PC 100 with the above arrangement according to this embodiment, will be described in detail with reference to a flowchart shown in FIG. 3. The processing corresponding to this flowchart can be implemented when the control unit 101 reads out, for example, a corresponding processing program stored in the storage medium 102, loads it into the memory 103, and executes it. Note that this rendering processing will be described as processing which starts when, for example, for each frame, update of the parameters of the frame or processing related to an operation input event is executed after the start of the game application. For the sake of descriptive simplicity, a game image can be generated by sequentially superimposing a background image, a character image associated with one character, and images (GUI images) associated with other graphical user interfaces at their corresponding positions.

In step S301, under the control of the control unit 101, the rendering unit 105 renders, in the display memory 106, a background image associated with a game image to be rendered.

In step S302, the control unit 101 decides the rendering direction of a target character for a character image to be superimposed on the rendered background image. The rendering direction may be relatively calculated, as described above, in consideration of, for example, a viewpoint position, a field center, a character arrangement position, motion produced by the character, and the like. Execution of the processing in this step may be controlled based on the presence/absence of a change in viewpoint from the previous frame and the presence/absence of the occurrence of an operation related to a change in 3D representation for the target character. If it is determined that there is one of the changes, the control unit 101 decides the rendering direction. Note that if it is determined that no operation related to a change in 3D representation is performed, the process advances to step S305 without processing steps S303 and S304, and the control unit 101 causes the rendering unit 105 to render the target character using the same part image group as that for the previous frame.

In step S303, the moving direction determination unit 104 determines a moving direction based on the information of the decided rendering direction of the target character related to the current frame and the information of the rendering direction of the target character related to the previous frame.

In step S304, based on the information of the determined moving direction, the information of the rendering direction of the target character related to the current frame, and the part information, the control unit 101 executes image group decision processing of deciding a part image group to be used for the 3D representation of the target character.

<Image Group Decision Processing>

Figure 4:
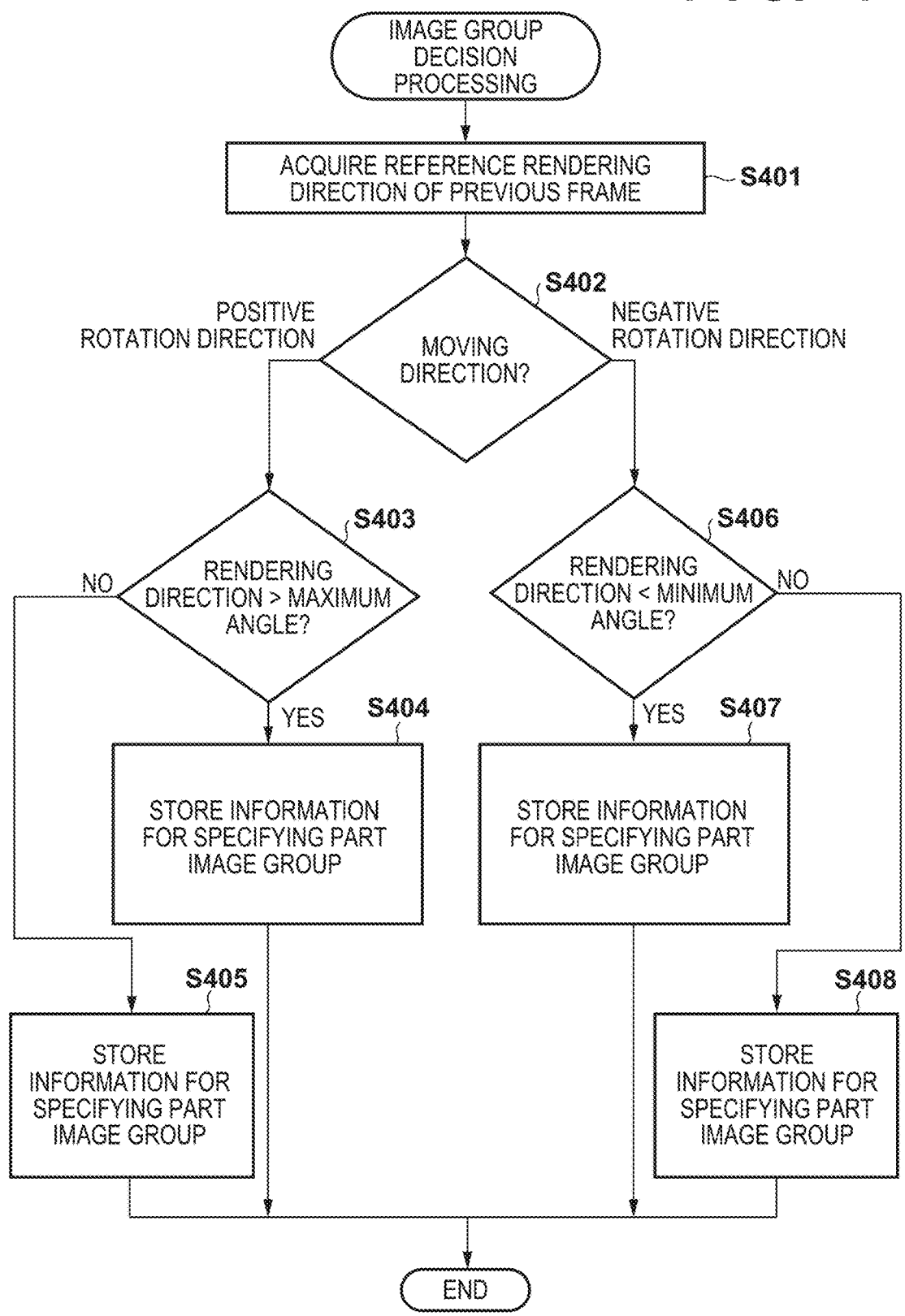
FIG. 4 is a flowchart exemplifying details of image group decision processing according to the first embodiment of the present invention.

Details of the image group decision processing performed in this step will be described with reference to a flowchart shown in FIG. 4.

In step S401, the control unit 101 acquires, from, for example, the memory 103, information of a reference rendering direction corresponding to the part image group used for the 3D representation of the target character related to the previous frame.

In step S402, the control unit 101 determines a direction indicated by the determined moving direction. In the image group decision processing according to this embodiment, based on the rendering direction identification method shown in FIG. 2A, the control unit 101 determines whether the moving direction is a positive rotation direction (counterclockwise: the angle increases) or a negative rotation direction (clockwise: the angle decreases). If the determined moving direction is a positive rotation direction, the control unit 101 shifts the process to step S403. If the determined moving direction is a negative rotation direction, the control unit 101 shifts the process to step S406.

In step S403, with reference to the part information, the control unit 101 acquires the information of the maximum angle of the representable range predetermined for the reference rendering direction corresponding to the part image group of the previous frame. The control unit 101 determines whether an angle corresponding to the rendering direction of the target character related to the current frame is larger than the maximum angle. If it is determined that the angle corresponding to the rendering direction of the target character related to the current frame is larger than the maximum angle, the control unit 101 stores, in step S404, in the memory 103, information of a reference rendering direction corresponding to an angle large next to the reference rendering direction corresponding to the part image group of the previous frame, which is different from that for the previous frame, as information for specifying a part image group to be used for the 3D representation of the target character of the current frame, thereby completing the image group decision processing. Alternatively, if it is determined that the angle corresponding the rendering direction of the target character related to the current frame is not more than the maximum angle, the control unit 101 stores, in step S405, in the memory 103, the information of the reference rendering direction corresponding to the same part image group as that for the previous frame as information for specifying a part image group to be used for the 3D representation of the target character of the current frame, thereby completing the image group decision processing.

On the other hand, if it is determined in step S402 that the moving direction is a negative rotation direction, the control unit 101 acquires, in step S406, with reference to the part information, the information of the minimum angle of the representable range predetermined for the reference rendering direction corresponding to the part image group of the previous frame. The control unit 101 determines whether the angle corresponding to the rendering direction of the target character related to the current frame is smaller than the smallest angle. If it is determined that the angle corresponding to the rendering direction of the target character related to the current frame is smaller than the smallest angle, the control unit 101 stores, in step S407, in the memory 103, information of a reference rendering direction corresponding to an angle small next to the reference rendering direction corresponding to the part image group of the previous frame as information for specifying a part image group to be used for the 3D representation of the target character of the current frame, thereby completing the image group decision processing. Alternatively, if it is determined that the angle corresponding to the rendering direction of the target character related to the current frame is not less than the minimum angle, the control unit 101 stores, in step S408, in the memory 103, the information of the reference rendering direction corresponding to the same part image group as that for the previous frame as information for specifying a part image group to be used for the 3D representation of the target character of the current frame, thereby completing the image group decision processing.

By performing the image group decision processing in this way, it is possible to decide, based on the angle threshold corresponding to the moving direction, a part image group to be used to render the 3D representation of the target character.

Then, in step S305 of the rendering processing, the rendering unit 105 renders, in the display memory 106, the 3D representation of the target character corresponding to the decided rendering direction related to the current frame using the part image group used for the 3D representation of the target character related to the current frame based on the result of the image group decision processing. At this time, if there is motion produced by the target character or the like, the rendering unit 105 renders each part image based on information of deformation and a position corresponding to the current frame of the motion.

In step S306, the rendering unit 105 superimposes GUI images on the images rendered in the display memory 106, and generates a game image to be output, thereby completing the rendering processing.

Note that the rendering processing according to this embodiment assumes that the part image group used to render the 3D representation of the character is changed to the part image group different from that for the previous frame when the rendering direction changes over the angle threshold determined in accordance with the moving direction. However, the embodiment of the present invention is not limited to this. That is, a character image related to the 3D representation of the target character may be generated by composing character images related to two kinds of 3D representations of the target character, which are rendered in the rendering direction using the part image groups related to the two patterns within, for example, an angle range from an angle near the angle threshold to the threshold in order to reduce a change in impression, that can be given to the observer, caused by changing some part images to different ones. For example, if the rendering direction transits from pattern A to pattern B in FIG. 2B, a composition ratio can be controlled to sequentially perform transition from a state in which the composition ratio between the character image based on the pattern image group related to pattern A and the character image based on the pattern image group related to pattern B is 100%:0% at 75° to a state in which the composition ratio between the character image based on the pattern image group related to pattern A and the character image based on the pattern image group related to pattern B is 0%:100% at 80°, thereby reducing a change in impression which can be given to the observer by the character image. Note that various methods such as Cross Dissolve or Dither Dissolve may be used for transition.

In this embodiment, each process such as determination of the moving direction is performed based on various kinds of data obtained for the previous frame. However, it will be readily understood that each process may be performed based on various kinds of data obtained for at least one of preceding frames in consideration of a reduction in calculation amount and the stability of processing.

Furthermore, this embodiment assumes that by setting, as a center, the axis in the vertical direction passing through the center of the head of the character, the moving direction is determined based on the rendering directions all around the target character and a part image group to be used for rendering is decided with reference to the angle threshold decided in accordance with the moving direction. However, the embodiment of the present invention is not limited to this. That is, it is not necessary to determine, based on uniaxial rotation or movement, the rendering direction range within which the same part image group is used. A range may be determined for a rendering direction along with rotation or movement about each axis or compound rotation or movement of multiaxial rotation or movement in the vertical direction and the like. In addition, the threshold of the rendering direction associated with decision of whether to change at least one of the part images of the part image group to a different image need not be determined to be different for opposite moving directions, unlike this embodiment. Different thresholds may respectively be assigned to predetermined moving directions considered as opposite directions for the sake of processing.

This embodiment assumes that the rendering direction range within which the same part image group is used is predetermined by the designer or the like so as to implement a desired 3D representation in a predetermined reference rendering direction. However, the embodiment of the present invention need not be limited to this. For example, if it can be evaluated by processing for a set rendering direction that there exists a part which is not rendered due to occlusion or the like, or a part or representation such as a shadow or hidden surface lacks in the part image group used so far, the control unit 101 may determine and set, based on a plurality of input character images of the reference rendering directions, the rendering direction range within which the same part image group is used.

This embodiment assumes that the part image group to be used to render the 3D representation within a range based on each reference rendering direction is defined for the whole "target character". However, the embodiment of the present invention is not limited to this. That is, the part image group used to render the 3D representation in accordance with the rendering direction need not be defined for the whole character, and may be defined for a 2D image of a partial element of the character, such as an "eye" formed by, for example, the eyelashes, pupil, iris, white, and lid. In this case, the above-described image group decision processing is performed for each partial element.

As described above, the information processing apparatus according to this embodiment can make it difficult to perceive switching of a 2D image used for the 3D representation of the 2D image. More specifically, the information processing apparatus generates rendered images related to the 3D representations of an object indicated by image groups each including a plurality of parts of 2D images by using the image groups to perform at least one of movement and deformation of each part included in the image groups. At this time, the apparatus sequentially decides rendering directions in which the object is rendered in the rendered images, and determines a moving direction determined by transition of the sequentially decided rendering directions. A rendering direction in which at least some parts of the image groups used to generate the rendered images are changed to different parts is differentiated in accordance with the determined moving direction.

[Second Embodiment]

On the other hand, in recent years, a display device which can implement binocular stereopsis of various contents including a game for the observer has become widespread. Such binocular stereoscopic display device allows the observer to perceive a stereoscopic effect by presenting left- and right-eye images having disparity to the corresponding eyeballs of the observer, respectively. More specifically, in images for binocular stereopsis, the appearances of an object are different depending on the eyeball positions and an object distance, and thus the brain of the observer recognizes the shift between the appearances and perceives the object distance in accordance with the shift amount.

As described in the first embodiment, if the part image group used to render the 3D representation of the character is differentiated in accordance with the rendering direction, images such as different part images related to a shadow representation which give an unnatural impression for binocular stereopsis can be selected for the left and right eyes. Especially, as shown in FIG. 5A, if inconsistent performance representation is performed so that a characteristic shape appears regardless of the rendering direction of the character, the characteristic shape may be extremely different depending on the rendering direction, and thus images which fail binocular stereopsis can be selected. In an example shown in FIG. 5A, in the 3D representations of the character, the forelocks are represented to flow in the horizontal direction in a rendering direction corresponding to an angle of 25° or more, and are represented to flow upward in a rendering direction corresponding to an angle of 0 to 25°. In cases of 501, 502, and 504, therefore, character images for stereopsis which do not fail binocular stereopsis can be presented. However, in a case of 503 in which a rendering direction corresponding to 20° is set for a left-eye character image and a rendering direction corresponding to 30° is set for a right-eye character image, stereopsis is failed.

Thus, to avoid such case in which binocular stereopsis is failed, in a PC 100 according to this embodiment, part information is formed for each reference rendering direction by including information (for example, the first type in which the forelocks flow in the horizontal direction, the second type in which the forelocks flow upward, and the like) indicating the type when the characteristic rendering representation of hairstyle or the like is implemented.

<<Rendering Processing>>

Rendering processing performed in the PC 100 according to this embodiment will be described in detail with reference to a flowchart shown in FIG. 6. Note that in the rendering processing according to this embodiment, the same reference symbols as in the rendering processing according to the first embodiment denote steps of performing the same processes and a description thereof will be omitted. Only characteristic processes in the rendering processing according to this embodiment will be described.

After background images are rendered in step S301, a control unit 101 decides, in step S601, for each of left- and right-eye character images to be superimposed on the rendered background image, the rendering direction of a target character, and shifts the process to step S303. Note that left- and right-eye background images are stored in a display memory 106.

After determination of a moving direction in step S303, the control unit 101 executes, in step S602, image group decision processing of deciding a part image group to be used for the 3D representation of the target character, based on the information of the determined moving direction, the information of the left- and right-eye rendering directions of the target character related to the current frame, and part information.

<Image Group Decision Processing>

Figure 7A:
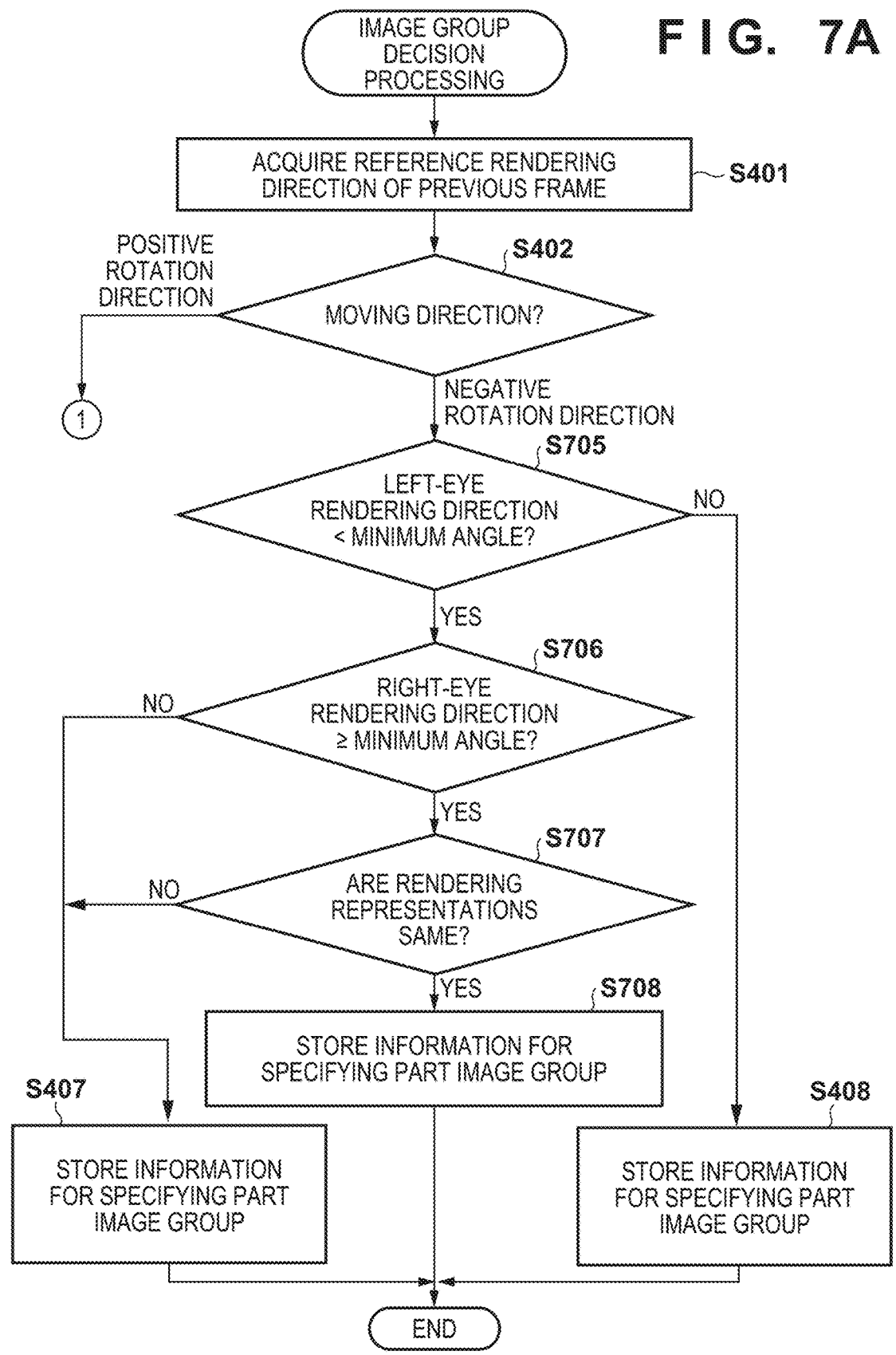
FIGS. 7A and 7B are flowcharts exemplifying details of image group decision processing according to the second embodiment of the present invention.
Figure 7B:
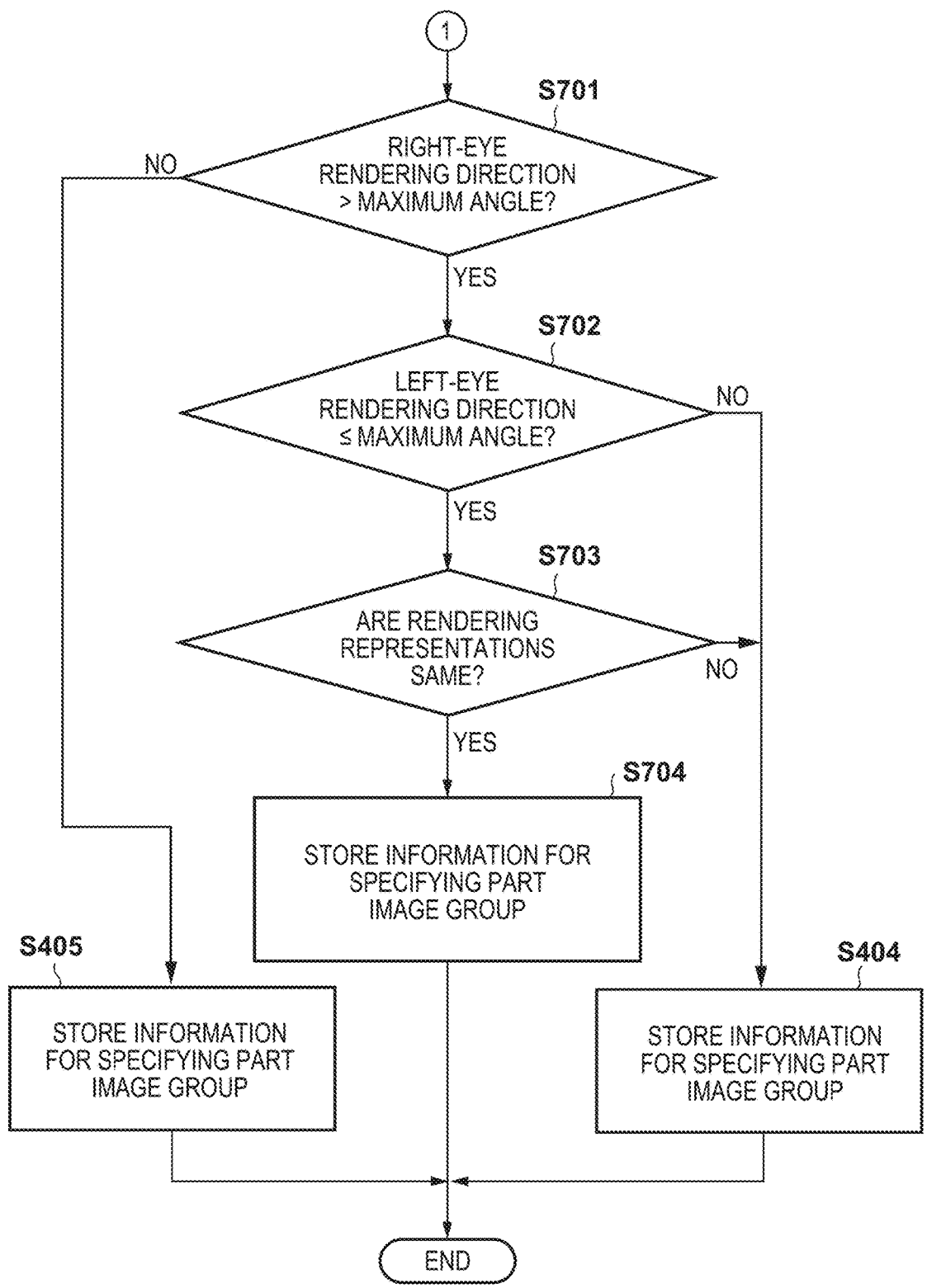

Details of the image group decision processing performed in this step will be described with reference to flowcharts shown in FIGS. 7A and 7B. Similarly to the rendering processing, the same reference symbols as in the image group decision processing according to the first embodiment denote steps of performing the same processes and a description thereof will be omitted. Only characteristic processes in the image group decision processing according to this embodiment will be described.

If it is determined in step S402 that the determined moving direction is a positive rotation direction, the control unit 101 acquires, in step S701, with reference to the part information, information of the maximum angle of a representable range predetermined for a reference rendering direction corresponding to the part image group of a previous frame. Note that if part image groups of the previous frame for the left and right eyes are different, the control unit 101 acquires, as maximum angle information, information of a smaller one of the maximum angles of the representable ranges predetermined for the reference rendering directions corresponding to the respective part image groups. In this case, in the succeeding processes, the reference rendering direction corresponding to the part image group of the previous frame indicates the reference rendering direction corresponding to the part image group used to render the left-eye 3D representation of the previous frame. The control unit 101 then determines whether an angle corresponding to the right-eye rendering direction of the target character related to the current frame is larger than the maximum angle. If it is determined that the angle corresponding to the right-eye rendering direction of the target character related to the current frame is larger than the maximum angle, the control unit 101 shifts the process to step S702; otherwise, the control unit 101 shifts the process to step S405.

In step S702, the control unit 101 determines whether an angle corresponding to the left-eye rendering direction of the target character related to the current frame is not more than the maximum angle of the representable range predetermined for the reference rendering direction corresponding to the part image group of the previous frame. If it is determined that the angle corresponding to the left-eye rendering direction of the target character related to the current frame is not more than the maximum angle, the control unit 101 shifts the process to step S703; otherwise, the control unit 101 shifts the process to step S404.

In step S703, with reference to the part information, the control unit 101 determines whether information indicating the type of characteristic rendering representation determined for the reference rendering direction corresponding to the part image group of the previous frame is the same as information indicating the type of characteristic rendering representation determined for a reference rendering direction corresponding to an angle large next to the reference rendering direction. If it is determined that the pieces of information indicating the types of characteristic rendering representations are the same, the control unit 101 stores, in step S704, in a memory 103, the information of the reference rendering direction corresponding to the same part image group as that for the previous frame as information for specifying a part image group to be used for the left-eye 3D representation of the target character of the current frame, and stores, in the memory 103, the information of a reference rendering direction corresponding to an angle large next to the reference rendering direction decided for the left eye as information for specifying a part image group to be used for the right-eye 3D representation of the target character of the current frame, thereby completing the image group decision processing. If it is determined that the pieces of information indicating the types of characteristic rendering representations are different, the control unit 101 shifts the process to step S404. That is, if the types of characteristic rendering representations are different, the control unit 101 stores, in the memory 103, information of a reference rendering direction corresponding to an angle large next to the reference rendering direction corresponding to the part image group of the previous frame as information for specifying a part image group to be used for the left- and right-eye 3D representations of the target character of the current frame so that the left- and right-eye character images indicate the same rendering representation, thereby completing the image group decision processing.

On the other hand, if it is determined in step S402 that the moving direction is a negative rotation direction, the control unit 101 acquires, in step S705, with reference to the part information, the information of the minimum angle of the representable range predetermined for the reference rendering direction corresponding to the part image group of the previous frame. Note that if the left- and right-eye part image groups of the previous frame are different, the control unit 101 acquires, as maximum angle information, information of a larger one of the minimum angles of the representable ranges predetermined for the reference rendering directions corresponding to the respective part image groups. In this case, in the succeeding processes, the reference rendering direction corresponding to the part image group of the previous frame indicates the reference rendering direction corresponding to the part image group used to render the right-eye 3D representation of the previous frame. The control unit 101 then determines whether an angle corresponding to the left-eye rendering direction of the target character related to the current frame is smaller than the minimum angle. If it is determined that the angle corresponding to the right-eye rendering direction of the target character related to the current frame is smaller than the minimum angle, the control unit 101 shifts the process to step S706; otherwise, the control unit 101 shifts the process to step S408.

In step S706, the control unit 101 determines whether the angle corresponding to the right-eye rendering direction of the target character related to the current frame is not less than the minimum angle of the representable range predetermined for the reference rendering direction corresponding to the part image group of the previous frame. If it is determined that the angle corresponding to the left-eye rendering direction of the target character related to the current frame is not less than the minimum angle, the control unit 101 shifts the process to step S707 otherwise, the control unit 101 shifts the process to step S407.

In step S707, with reference to the part information, the control unit 101 determines whether information indicating the type of characteristic rendering representation determined for the reference rendering direction corresponding to the part image group of the previous frame is the same as information indicating the type of characteristic rendering representation determined for a reference rendering direction corresponding to an angle small next to the reference rendering direction. If it is determined that the pieces of information indicating the types of characteristic rendering representations are the same, the control unit 101 stores, in step S708, in the memory 103, the information of the reference rendering direction corresponding to the angle small next to the reference rendering direction corresponding to the part image group of the previous frame as information for specifying a part image group to be used for the left-eye 3D representation of the target character of the current frame, and stores, in the memory 103, information of a reference rendering direction corresponding to an angle large next to the reference rendering direction decided for the left eye as information for specifying a part image group to be used for the right-eye 3D representation of the target character of the current frame, thereby completing the image group decision processing. If it is determined that the pieces of information indicating the types of characteristic rendering representations are different, the control unit 101 shifts the process to step S407. That is, if the types of characteristic rendering representations are different, the control unit 101 stores, in the memory 103, the information of the reference rendering direction corresponding to the angle small next to the reference rendering direction corresponding to the part image group of the previous frame as information for specifying the part image group to be used for the left- and right-eye 3D representations of the target character of the current frame so that the left- and right-eye character images indicate the same rendering representation, thereby completing the image group decision processing.

With the above processing, even if rendering directions in which part image groups including different characteristic rendering representations are selected for the 3D representations of the target character rendered for the left and right eyes are selected for the left and right eyeballs, the image group decision processing can decide the part image group corresponding to the same reference rendering direction for the left and right eyes so that the rendering representations are integrated into one of them, as shown in FIG. 5B. Consequently, it is possible to avoid an occurrence of failed binocular stereopsis caused by different characteristic rendering representations in the left- and right-eye character images.

In step S603 of the rendering processing, a rendering unit 105 renders, in the display memory 106, the left- and right-eye 3D representations of the target character corresponding to the decided rendering directions related to the current frame using the left- and right-eye part image groups used for the 3D representations of the target character related to the current frame based on the result of the image group decision processing. At this time, if there is motion produced by the target character or the like, the rendering unit 105 renders each part image based on information of deformation and a position corresponding to the current frame of the motion.

Note that the image group decision processing according to this embodiment assumes that since the representable ranges predetermined for adjacent reference rendering directions have an overlapping range, as in the first embodiment, if only one of the rendering directions decided for the left and right eyes exceeds the overlapping range and falls within a representable range corresponding to only another reference rendering direction, a part image group related to the other reference rendering direction is used for the left and right eyes. This is based on the assumption that if angles corresponding to the rendering directions decided for the left and right eyes, which have disparity associated with binocular stereopsis, are close to each other, and one of the rendering directions falls within the representable range associated with only the other reference rendering direction, the other rendering direction falls within the overlapping range, and a 3D representation can be implemented even by a part image group related to a plurality of reference rendering directions. However, the embodiment of the present invention is not limited to this, and the overlapping range may be determined so that the same part image group is used to render the 3D representation in this situation.

If transition is performed when a part image group is switched, as described above in the first embodiment, especially if a character image is switched for each pixel or each region of a predetermined size like Dither Dissolve, in transition in left- and right-eye character images, a region or pixel of the character image at a corresponding position between the images can reduce an occurrence of failed binocular stereopsis at the time of transition by controlling to use character images generated from the same part image group.

This embodiment assumes that a part image group used to render a 3D representation is formed by 2D images. The embodiment of the present invention, however, is not limited to this. For example, the present invention is applicable to a case in which a combination of parts of 3D models is differentiated for an observation angle in consideration of an impression given by a rendered character image, and a part model group is defined for each angle. In this case as well, if a part model group used to render a character image presented to one eyeball is changed to a part model group of a combination associated with a different angle, control is performed to use a part model group of a combination associated with a corresponding angle for a part model group used to render a character image presented to the other eyeball. However, if the parts of the 3D models are used, a character image may be rendered by performing geometric deformation of each part model in accordance with predetermined adjustment parameters like the part image group of 2D images, or a character image may be rendered by a normal rendering method in accordance with the positional relationship between a viewpoint and the parts of the 3D models.

[Other Embodiments]

The present invention is not limited to the above embodiments and various changes and modifications can be made without departing from the spirit and scope of the present invention. An information processing apparatus according to the present invention can also be implemented by a program for causing one or more computers to function as the information processing apparatus. This program can be provided/distributed by being recorded in a computer-readable recording medium or via an electrical communication line. Therefore, to apprise the public of the scope of the present invention, the following claims are made.

What is claimed is:

1. A non-transitory computer-readable recording medium recording a program for causing at least one computer, capable of generating a left-eye rendered image and a right-eye rendered image for binocular stereopsis which are associated with 3D representations of an object indicated by image groups each including a plurality of parts of 2D images by using the image groups to perform at least one of movement and deformation of each part included in the image groups, to execute:

processing of sequentially deciding rendering directions in which the object is rendered in the rendered images;

processing of determining a moving direction determined by transition of the rendering directions sequentially decided in the processing of sequentially deciding;

processing of differentiating the rendering direction, in which at least some parts of the image groups used to generate the rendered images are changed to different parts, in accordance with the moving direction determined in the processing of determining; and processing of changing a plurality of parts included in the image groups used to generate the rendered images, based on a result of the processing of differentiating, wherein if parts included in the image group used for the left-eye rendered image are different from parts included in the image group used for the right-eye rendered image, the processing of changing changes the parts included in the image group used for one of the rendered images to be the same as the parts included in the image group used for the other rendered image.

2. The non-transitory recording medium according to claim 1, wherein the processing of differentiating differentiates the rendering direction, in which the at least some parts are changed to the different parts, between a first moving direction and a second moving direction predetermined as a direction opposite to the first moving direction.

3. The non-transitory recording medium according to claim 1, wherein the program further causes the at least one computer to execute processing of predetermining the rendering direction in which the at least some parts are changed to the different parts.

4. The non-transitory recording medium according to claim 1, wherein the rendering direction in which the at least some parts are changed to the different parts is determined in accordance with whether one of the plurality of parts included in each of the image groups is shaded.

5. The non-transitory recording medium according to claim 1, wherein the rendering direction in which the at least some parts are changed to the different parts is determined in accordance with whether it is necessary to use a part not included in each of the image groups to generate the rendered images.

6. The non-transitory recording medium according to claim 1, wherein
the program further causes the at least one computer to execute processing of generating the rendered images using the image groups based on the rendering directions decided in the processing of deciding, and
if the rendering directions decided in the processing of deciding fall within a predetermined range from the rendering direction in which the at least some parts of the image groups used to generate the rendered images are changed to the different parts, the processing of generating generates the rendered images by composing first rendering images generated using the image groups before the at least some parts are changed to the different parts and second rendered images generated using the image groups after the at least some parts are changed to the different parts.

7. The non-transitory recording medium according to claim 1, wherein if the rendering direction in which the at least some parts are changed to the different parts exists between the rendering direction of the object in the left-eye rendered image and the rendering direction of the object in the right-eye rendered image, the processing of changing changes the parts so that the parts included in the image groups are the same.

8. A non-transitory computer-readable recording medium recording a program for causing at least one computer, capable of generating a left-eye rendered image and a right-eye rendered image for binocular stereopsis which are associated with 3D representations of an object indicated by model groups each including a plurality of parts of 3D models by using the model groups, to execute:

processing of sequentially deciding rendering directions in which the object is rendered in the rendered images;

processing of determining a moving direction determined by transition of the rendering directions sequentially decided in the processing of sequentially deciding;

processing of differentiating the rendering direction, in which at least some parts of the model groups used to generate the rendered images are changed to different parts, in accordance with the moving direction determined in the processing of determining; and processing of changing a plurality of parts included in the model groups used to generate the rendered images, based on a result of the processing of differentiating, wherein if parts included in the model group used for the left-eye rendered image are different from parts included in the model group used for the right-eye rendered image, the processing of changing changes the parts included in the model group used for one of the rendered images to be the same as the parts included in the model group used for the other rendered image.

9. An information processing apparatus for generating a rendering instruction of a left-eye rendered image and a right-eye rendered image for binocular stereopsis which are associated with 3D representations of an object indicated by image groups each including a plurality of parts of 2D images by using the image groups to perform at least one of movement and deformation of each part, comprising:

a decider which is able to sequentially decide rendering directions in which the object is rendered in the rendered images;

a determiner which is able to determine a moving direction determined by transition of the rendering directions sequentially decided by the decider;

a controller which is able to differentiate the rendering direction, in which at least some parts of the image groups used to generate the rendered images are changed to different parts, in accordance with the moving direction determined by the determiner; and a changer which is able to change a plurality of parts included in the image groups used to generate the rendered images, based on a control result by the controller, wherein if parts included in the image group used for the left-eye rendered image are different from parts included in the image group used for the right-eye rendered image, the changer changes the parts included in the image group used for one of the rendered images to be the same as the parts included in the image group used for the other rendered image.

10. An information processing apparatus for generating a rendering instruction of a left-eye rendered image and a right-eye rendered image for binocular stereopsis which are associated with 3D representations of an object indicated by model groups each including a plurality of parts of 3D models by using the model groups, comprising:

a decider which is able to sequentially decide rendering directions in which the object is rendered in the rendered images;

a determiner which is able to determine a moving direction determined by transition of the rendering directions sequentially decided by the decider;

a controller which is able to differentiate the rendering direction, in which at least some parts of the model groups used to generate the rendered images are changed to different parts, in accordance with the moving direction determined by the determiner; and a changer which is able to change a plurality of parts included in the model groups used to generate the rendered images, based on a control result by the controller, wherein if parts included in the model group used for the left-eye rendered image are different from parts included in the model group used for the right-eye rendered image, the changer changes the parts included in the model group used for one of the rendered images to be the same as the parts included in the model group used for the other rendered image.

11. A control method for an information processing apparatus for generating a rendering instruction of a left-eye rendered image and a right-eye rendered image for binocular stereopsis which are associated with 3D representations of an object indicated by image groups each including a plurality of parts of 2D images by using the image groups to perform at least one of movement and deformation of each part, the method comprising:

a decision step of sequentially deciding rendering directions in which the object is rendered in the rendered images;

a determination step of determining a moving direction determined by transition of the rendering directions sequentially decided in the decision step;

a control step of differentiating the rendering direction, in which at least some parts of the image groups used to generate the rendered images are changed to different parts, in accordance with the moving direction determined in the determination step; and a change step of changing a plurality of parts included in the image groups used to generate the rendered images, based on a control result in the control step, wherein if parts included in the image group used for the left-eye rendered image are different from parts included in the image group used for the right-eye rendered image, the parts included in the image group used for one of the rendered images are changed in the change step to be the same as the parts included in the image group used for the other rendered image.

12. A control method for an information processing apparatus for generating a rendering instruction of a left-eye rendered image and a right-eye rendered image for binocular stereopsis which are associated with 3D representations of an object indicated by model groups each including a plurality of parts of 3D models by using the model groups, the method comprising:

a decision step of sequentially deciding rendering directions in which the object is rendered in the rendered images;

a determination step of determining a moving direction determined by transition of the rendering directions sequentially decided in the decision step;

a control step of differentiating the rendering direction, in which at least some parts of the model groups used to generate the rendered images are changed to different parts, in accordance with the moving direction determined in the determination step; and a change step of changing a plurality of parts included in the model groups used to generate the rendered images, based on a control result in the control step, wherein if parts included in the model group used for the left-eye rendered image are different from parts included in the model group used for the right-eye rendered image, the parts included in the model group used for one of the rendered images are changed in the change step to be the same as the parts included in the model group used for the other rendered image.

* * * * *